July 8, 1924.                         1,500,214
S. WILEY
PROJECTOR
Filed March 7, 1923        2 Sheets-Sheet 1

INVENTOR
Samuel Wiley
BY W. N. Roach
ATTORNEY

July 8, 1924.

S. WILEY

PROJECTOR

Filed March 7, 1923

INVENTOR
Samuel Wiley
BY
W. N. Roach
ATTORNEY

Patented July 8, 1924.

1,500,214

UNITED STATES PATENT OFFICE.

SAMUEL WILEY, OF METUCHEN, NEW JERSEY.

PROJECTOR.

Application filed March 7, 1923. Serial No. 623,465.

(FILED UNDER THE ACT OF MARCH 3, 1883, 22 STAT. L., 625.)

*To all whom it may concern:*

Be it known that I, SAMUEL WILEY, a citizen of the United States, and a resident of Metuchen, county of Middlesex, and State of New Jersey, have invented an Improvement in Projectors, of which the following is a specification.

The invention described herein may be used by the Government, or any of its officers or employees in prosecution of work for the Government, or by any other person in the United States, without payment to me of any royalty thereon, in accordance with the act of March 3, 1883.

The subject of this invention is a projector intended for use, primarily, on aircraft and adapted to release a flare, signal or other device from the craft.

In the design of a projector for aircraft it is highly desirable that the projector be so constructed that it may be easily charged or loaded and that, should the flare or similar device fail to function or misfire, the same may be readily released from the craft without danger of injury to the craft or its occupants.

The present invention has been devised with the above desirable objects in view.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is shown, by way of illustration, in the accompanying drawings, wherein:

Fig. 6 is an enlarged detailed sectional view of one of the retaining plungers.

Figure 1:
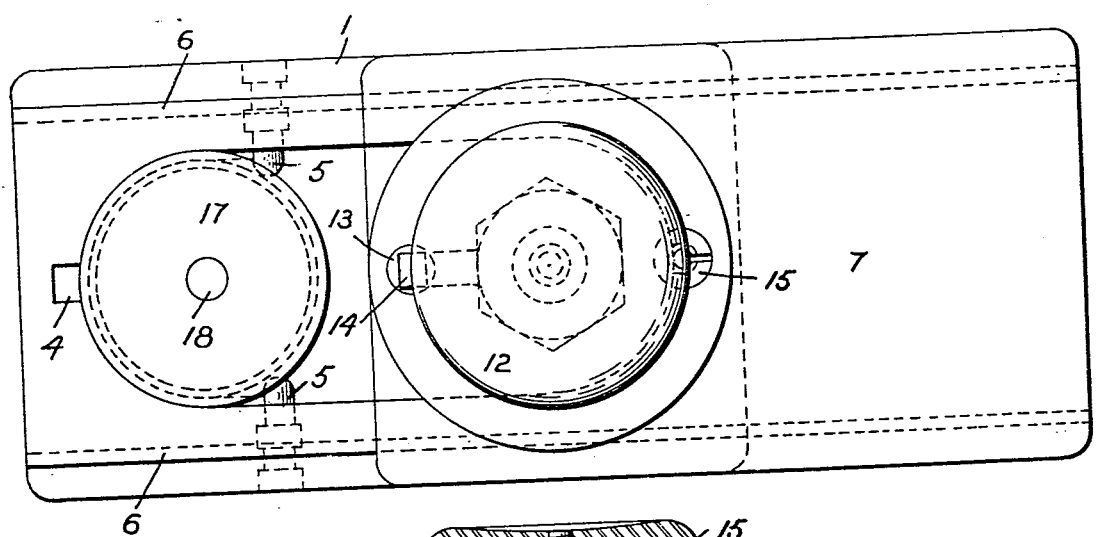
Fig. 1 is a plan view of the device, the parts shown in position for loading.
Figure 2:
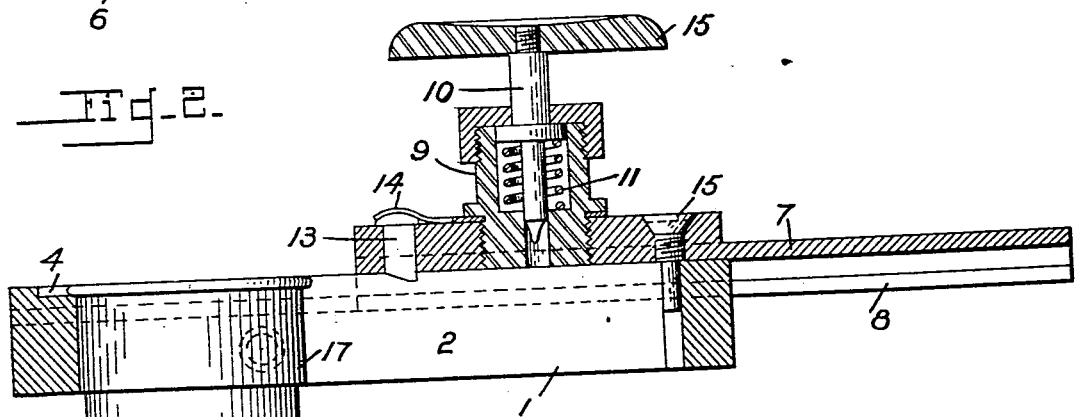
Fig. 2 is a central longitudinal section of the device, the parts shown in the same position as in Fig. 1.

Referring to the drawings by numerals of reference:

In carrying out my invention I prefer to provide a plate 1 which may be attached to any part of the aircraft, preferably in an aperture formed in the floor thereof, which plate is provided with a longitudinally extending aperture 2, and countersunk at one end of the aperture to form a seat 3 for the rim of the cap or shell of the signal and a recess 4 into which the extractor may enter. Mounted in the sides of the plate, adjacent the seat 3, are spring pressed plungers 5 which are so positioned as to engage the cap or shell when in position on the seat and releasably retain the same in such position. Grooves 6 may be provided in opposite sides of the plate.

Mounted on the plate to reciprocate longitudinally thereof is a slide 7 having depending longitudinal edges formed with tongues 8 adapted to engage in the grooves 6 of the plate and retain the slide and plate assembled. The plate is apertured and tapped for the reception of a housing 9 in which is mounted a firing pin 10, normally held in elevated position by suitable means such as the spring 11. Secured on the upwardly projecting end of the firing pin is a knob 12. Reciprocable in an aperture formed in the slide is an extractor 13 which is held in its lowermost position by a suitable spring 14, which spring may be conveniently clamped in place upon the slide by the firing pin housing 9. In order to limit the movement of the slide, a stop screw 15 may be threaded through the slide the downwardly projecting end thereof being suitably spaced from the extractor to allow the shell to be positioned between the extractor and the screw.

Figure 3:
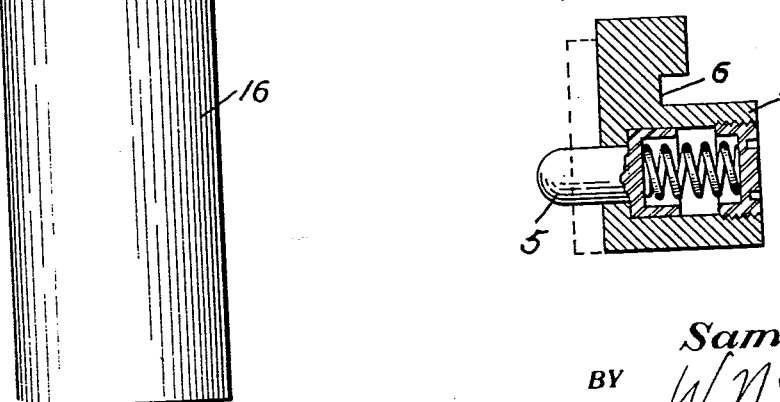
Fig. 3 is a similar view, the parts in firing position.
Figure 3:
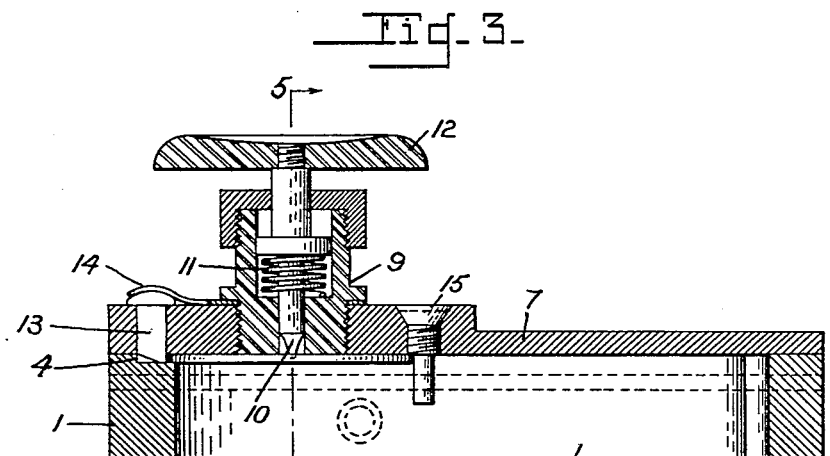
Figure 4:
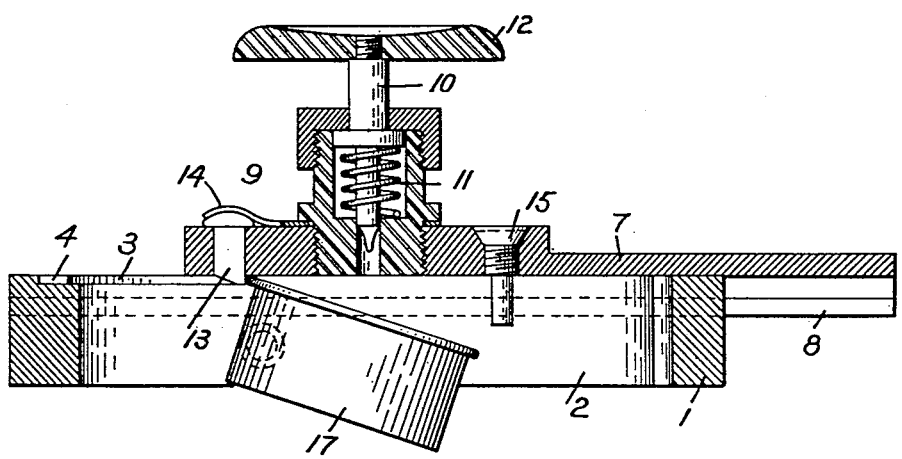
Fig. 4 is a similar view, the parts shown in position of extraction of the cap or shell of the signal.
Figure 5:
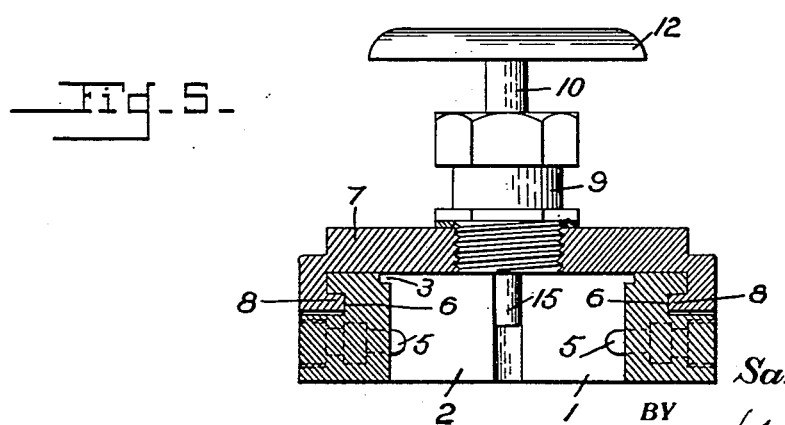
Fig. 5 is a section taken on the line 5—5 of Fig. 3.

In operating the device this slide is drawn back to the position shown in Fig. 1 and the signal consisting of a container 16 held in a shell or cap 17 in which is provided a primer 18 is placed in position, with the rim of the shell seated on the seat 3 and held thereon by the plungers 5. The slide is then moved to the position shown in Fig. 3 in which position the extractor will snap into the recesses 4 and engage the rim of the cap 17 and the firing pin will be immediately above the primer 18. When it is desired to discharge the signal or similar device a sharp blow on the knob 12 will force the pin down against the primer to prime the primer and ignite the small charge contained in the cap or shell 17 which will expel the signal or flare body 16 and at the same time ignite the pyrotechnic compound contained therein. The slide may then be drawn to the position shown in Fig. 1 and, in drawing the slide back to such position the extractor will force the shell 17 against the plungers 5 causing the plungers to compress their springs and allow the shell to pass from its seat and fall by gravity from the aircraft.

From the foregoing it is readily understood that, should the signal or flare fail to function, the slide may be drawn back to open position releasing the flare and its shell and allowing the same to fall clear of the aircraft without injury or danger to the craft or its occupants.

I claim:

1. A projector, embodying a plate formed with an elongated aperture one end of which provides a rest for a signal device, yielding means for holding a signal in place, a slide on the plate, a housing secured to the slide, a firing pin mounted in the housing and adapted to be brought to position over the primer of a signal, an extractor for extracting the shell of a signal device and means for limiting the movement of the slide.

2. A projector, embodying a plate, a seat for the shell of a signal device provided on the plate, a slide movable over and away from said seat, a firing pin carried by the slide and operable to prime the primer of a signal device, an extractor carried by the slide for extracting the shell of a signal device to allow the same to fall by gravity and means for limiting the movement of the slide.

3. A projector, embodying a plate, a seat for the shell of a signalling device provided in the plate, a slide movable over and away from said seat, a firing pin carried by the slide and operable to prime the primer of the signalling device and an extractor carried by the slide adapted to engage the signalling device when the slide is moved over the seat and to slide the signal device from the seat when the slide is moved away from the seat.

4. A projector, embodying a plate, means provided on the plate for holding a signal to be discharged, a slide mounted on the plate and movable to positions above and away from the holding means, means carried by the slide for igniting the signal and means carried by the slide for releasing the signal as the slide is moved away from the holding means.

SAMUEL WILEY.